July 26, 1927.
W. A. ECKERT
1,637,218
SIGNAL CONTROL MECHANISM FOR AUTOMOBILES
Filed July 9, 1924
3 Sheets-Sheet 2
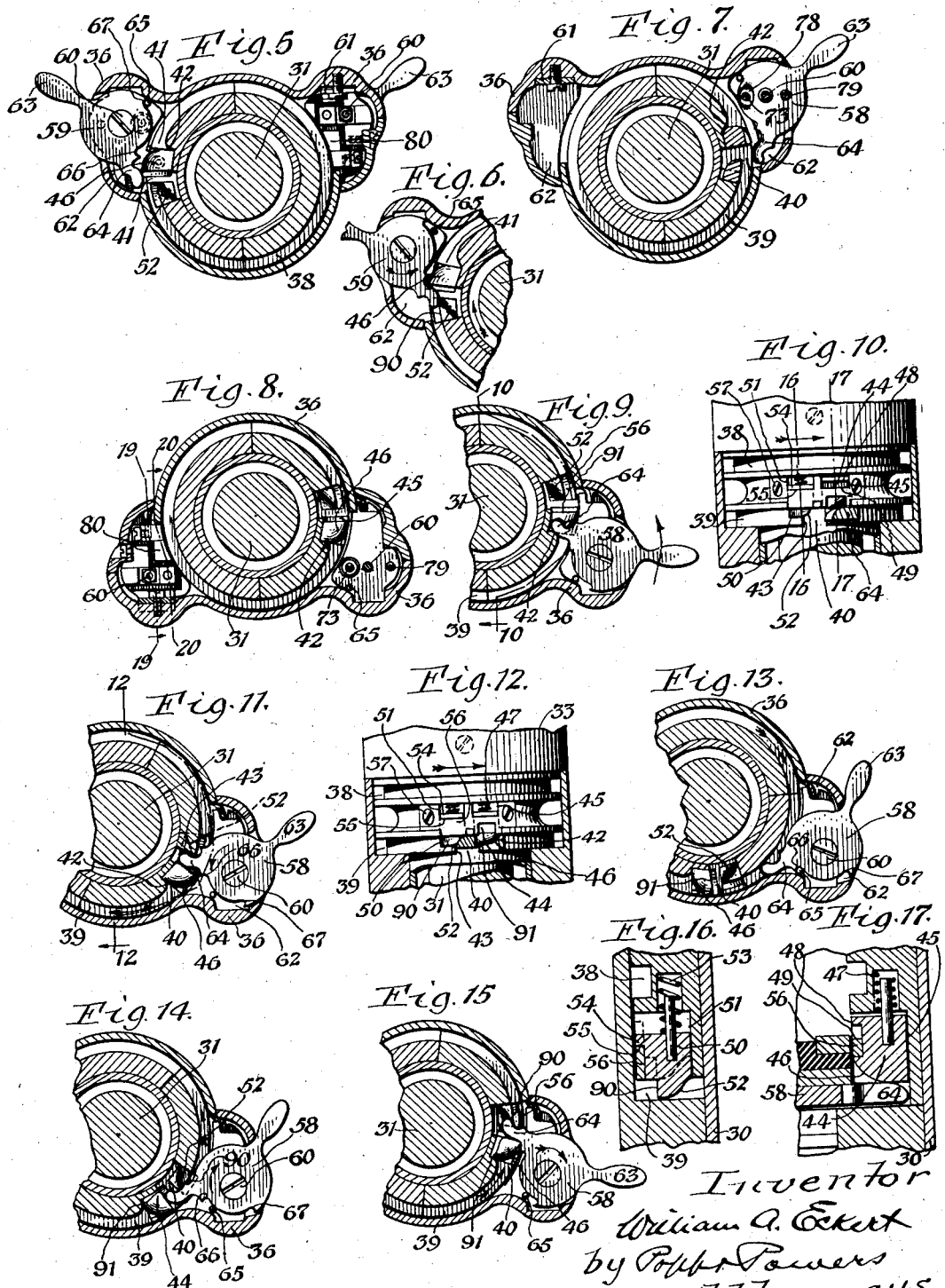

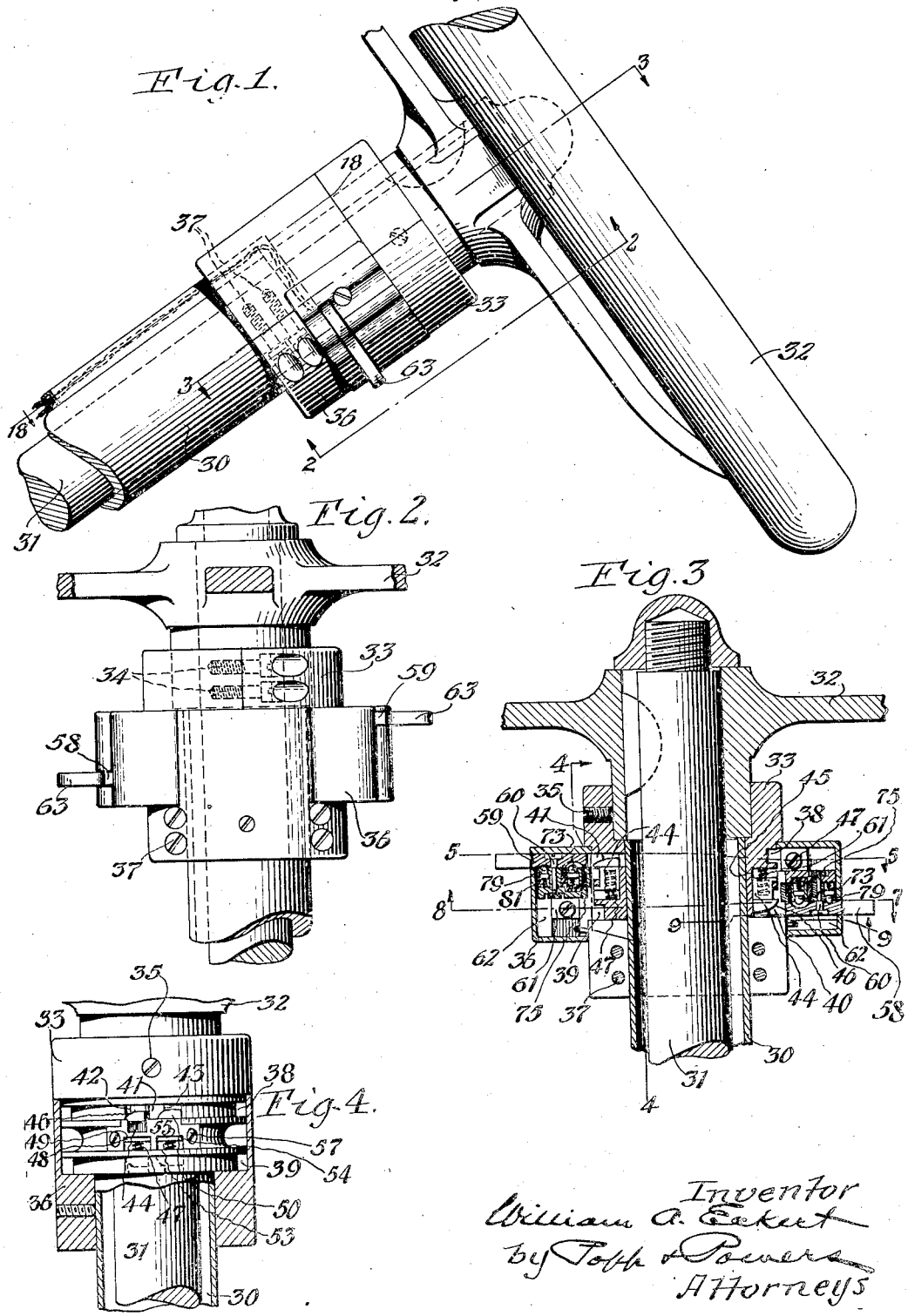

July 26, 1927.
W. A. ECKERT
1,637,218
SIGNAL CONTROL MECHANISM FOR AUTOMOBILES
Filed July 9, 1924
3 Sheets-Sheet 3
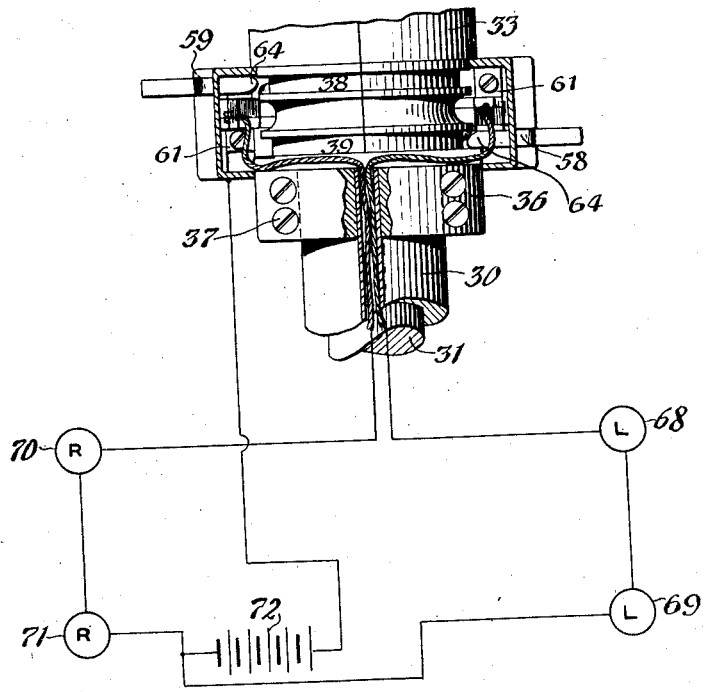
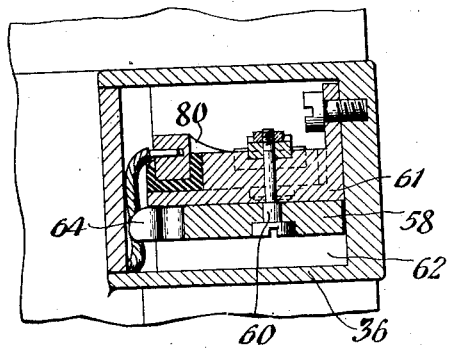
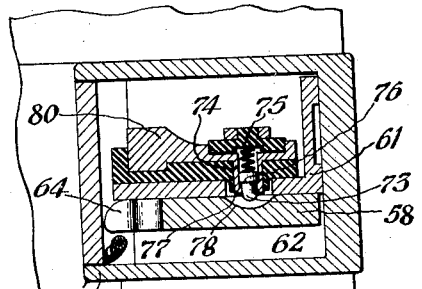
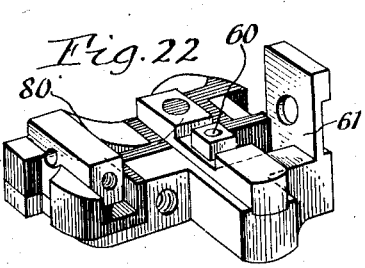
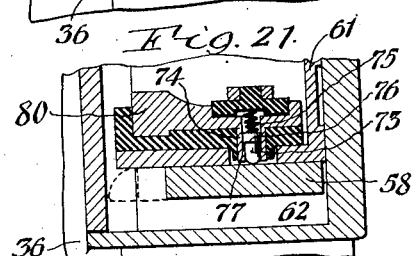
Inventor
William A. Eckert
by Robt Powers
Attorneys Patented July 26, 1927.

1,637,218

UNITED STATES PATENT OFFICE.

WILLIAM A. ECKERT, OF BUFFALO, NEW YORK.

SIGNAL-CONTROL MECHANISM FOR AUTOMOBILES.

Application filed July 9, 1924. Serial No. 725,060.

This invention relates to a signaling mechanism of that type which is more particularly designed for use on automobiles whereby the driver of a car is able to give a warning as to the direction he is about to turn and therefore facilitate traffic and avoid accidents.

The present invention is an improvement on the forms of signaling mechanisms of this type on which I have filed applications for Letters Patent No. 658,812 filed August 22, 1923, and No. 633,850 filed April 23, 1923.

It is the object of the present invention to provide a signaling mechanism of this character which will reduce lost motion between the several movable parts and not only cause the indicating elements to be locked in the set condition immediately after the operation of turning the automobile in one direction or the other has begun but also to prevent such indicating device from being again unset until the turning motion of the car has been almost completed, thereby insuring retention of the signal in its set condition for the proper length of time while making a turn of the car and also avoiding disputes as to the condition of the signaling mechanism if at any time an accident should arise in which the particular vehicle equipped with this signaling device is a participant.

Other objects of this invention are to improve the construction of the signaling mechanism as a whole for the purpose of making the same operate with certainty and reliability and also to permit of manufacturing the same economically and easily applicable to the standard types of automobiles now on the market.

In the accompanying drawings:

Figure 1 is a fragmentary side elevation of the steering post, wheel and column of an automobile steering mechanism equipped with my improved direction signaling mechanism.

Figure 2 is a sectional front elevation of the same, the section being taken on line 2—2 of Figure 1.

Figure 3 is a vertical transverse section thereof taken on the correspondingly numbered lines in Figure 1 and looking rearwardly.

Figure 4 is a longitudinal section taken on line 4—4 of Figure 3 and looking in the direction of the arrow associated with this line.

Figure 5 is a horizontal section taken on line 5—5 of Figure 3 looking downwardly and showing both the right and left hand signaling switches in their retracted or inoperative positions.

Figure 6 is a fragmentary sectional view on the same line showing the right-hand switch lever turned partly into its operative position.

Figure 7 is a horizontal section taken on line 8—7 of Figure 3 looking downwardly, and showing the left-hand switch lever in its retracted or inoperative position.

Figure 8 is also a section on line 8—7 of Figure 3 but looking upwardly.

Figure 9 is a fragmentary sectional view on line 9—9 of Figure 3 looking upwardly, but showing the left hand switch lever moved part-way into its operative position.

Figure 10 is a vertical section taken on line 10—10 of Figure 9.

Figure 11 is a sectional view similar to Figure 9 but showing the relative parts of the left-hand switch mechanism in the position which they occupy when the steering column has effected the initial part of its turning movement toward the left.

Figure 12 is a fragmentary vertical section taken on line 12—12 of Figure 11.

Figure 13 is a view similar to Figure 11 but showing the relative position of the parts of the left-hand switch mechanism when the steering column has effected the second portion or step of its turning movement toward the left.

Figure 14 is a similar view showing the relative position of the left-hand switch mechanism as the steering post is about to complete its return movement from the left to the neutral or central position and the left-hand switch lever is about to complete its return or backward motion for opening the circuit of the respective switch.

Figure 15 is a similar view showing the position of the parts of the left-hand switch mechanism which they assume as the left-hand switch lever is about to complete its opening or unsetting movement by motion derived from the steering column as the same returns from its motion toward the left backwardly into its neutral or central position.

Figures 16 and 17 are fragmentary vertical sections, on an enlarged scale, taken on the correspondingly numbered lines in Figure 10.

Figure 18 is a fragmentary sectional elevation of the housing or casing and adjacent parts of the steering mechanism and signaling mechanism viewed from the rear and showing the electric circuits in diagrammatic form, this section being taken on line 18—18 of Figure 1.

Figures 19 and 20 are vertical sections, on an enlarged scale, taken on lines 19—19 and 20—20 of Figure 8, respectively.

Figure 21 is a sectional view similar to Figure 20, but showing a different position of the switch members.

Figure 22 is a perspective view of the stationary contacts of one of the electric switches.

Similar characters of reference indicate like parts throughout the several views.

Although my improved direction signaling mechanism may be mounted on any suitable or available parts of the steering mechanism of an automobile the same is, for example, in the present instance mounted partly on the stationary steering column 30 and partly on the steering shaft or post 31 which is journaled within the column and connected at its lower end with the steering wheels of the car, while its upper end is provided with the usual hand wheel 32 whereby the steering gear is manipulated.

Those parts of the signaling mechanism which are carried by the steering post are mounted on a carrier 33 which as a whole is of substantially circular or sleeve form, this sleeve being partly divided lengthwise into two sections which are connected to each other by means of screws 34 and secured to the hub of the wheel 32 by means of a clamping screw 35, as shown in Figure 3 so as to cause this carrier sleeve to rotate with the steering post 31. Other parts of the direction signaling mechanism are mounted on a casing 36 which surrounds and encloses the lower part of the carrier sleeve and is also preferably divided lengthwise of the sections which are secured to each other by means of screws 37, which latter also serve to secure the casing sections to the upper part of the steering column 30 which serves as a stationary support therefor.

On the lower part of the periphery of the carrier sleeve and within the upper part of the enclosing casing this carrier sleeve is provided with upper and lower circumferential locking grooves or channels 38, 39. Each of these locking channels is provided in one part of the bottom thereof with an inwardly extending enlargement forming a clearance chamber. The clearance chambers of these channels are arranged on diametrically opposite sides of the carrier sleeve, and the clearance chamber 40 of the lower channel 39 being preferably arranged on the left-hand side of the steering post 31 while the clearance chamber 41 of the upper channel 38 is arranged on the right-hand side of the steering post. The rear end of each clearance chamber is provided with a rear shoulder 42 and the front end of each of these chambers is provided with a front shoulder 43.

Within the rear part of each of these clearance chambers is arranged a restoring dog or pawl which in the preferred construction is guided on the adjacent part of the carrier sleeve so as to be capable of movement in a direction lengthwise or parallel with the axis of the steering post 31.

The restoring dog 44 in the lower clearance chamber slides in a guideway 45 in that part of the carrier sleeve immediately above this chamber and the lower or operative end 46 of this dog projects downwardly from the top of this chamber and is yieldingly held in the circular path of the lower channel by means of a spring 47 interposed between the upper side of this dog and the adjacent part of the carrier sleeve, as shown in Figure 17. Downward movement of the lower left-hand restoring dog under the action of the spring 47 is limited by means of co-operating stops 48, 49 formed on this dog and the adjacent part of the carrier sleeve, as shown in Figure 17. The lower or operative end 46 of this dog 44 is rounded, inclined or of cam shape, as shown in Figures 10, 12 and 17 for a purpose which will presently appear, and this end of the dog is arranged adjacent to the rear shoulder 42 in the clearance chamber of the lower locking channel. In the front part of the clearance chamber of each channel is arranged a retaining dog 50 which is slidable in a guideway 51 on the adjacent part of the carrier sleeve so that this dog is movable lengthwise or parallel with the axis of the steering post, this guideway being formed on that part of the carrying sleeve between the two channels. In the case of the retaining dog 50 the lower curved or cam shaped end 52 of this dog is adapted to project downwardly into the circular path of the lower locking channel. This retaining dog is yieldingly held in this position by means of a spring 53 interposed between the top of this dog and the adjacent part of the carrying sleeve and its downward movement under the action of the spring 53 being limited by co-operating stops 54, 55 formed on this dog and the adjacent part of the carrying sleeve, as shown for example in Figures 10, 12 and 16. This retaining dog is arranged with its lower or operative end 52 adjacent to the front shoulder 43 of the respective clearance chamber.

The construction and method of operation of the restoring and retaining dogs on the lower part of the left-hand side of the carrying sleeve and on the upper part of the right-hand side the same are substantially alike, and the description with reference to left-hand dogs and the reference characters associated therewith are therefore equally applicable to the restoring and retaining dogs on the right-hand side of this sleeve, the only difference being that in the case of the left-hand dogs the same move downwardly into their operative position while in the case of the right-hand dogs the same move upwardly into their operative position. This construction permits of making the two restoring dogs alike and also the two retaining dogs alike, thereby rendering these parts interchangeable and reducing the cost of manufacture.

For the purpose of enabling the dogs to be introduced into their guideways as well as removed therefrom with ease and convenience each of these guideways has its inner part formed on the carrying sleeve while the outer part thereof is formed on a guide plate 56 which is detachably secured to the carrying sleeve by means of screws 57.

On opposite sides of the carrying sleeve two switch levers 58, 59 are mounted on the casing, which levers are adapted to be manipulated for setting and unsetting indicators such as electric signal lamps, and the movement of these levers being controlled by the mechanism mounted on the carrying sleeve. Each of these switch levers is pivotally mounted by means of an upright screw 60 through a bracket 61 which is arranged within a lateral extension 62 on the adjacent part of the housing or casing which encloses the carrying sleeve, so that the axis of each of these levers is arranged parallel with the axis of the steering post 31. The switch lever 58 is adapted to co-operate with the lower locking channel and the left-hand clearance chamber and the dogs mounted therein and is arranged on the under side of the respective bracket 61, as shown in Figures 3, 10, 12, 17, 19, 20 and 21. The right-hand switch lever 59 is adapted to engage with the upper locking channel and with the right-hand clearance chamber and dogs and is arranged above its respective supporting bracket 61, as shown in Figure 3.

Each of these switch levers is provided with an outer arm 63 whereby the same may be operated manually and the same also has an inner arm 64 which is adapted to co-operate with the companion locking channel, clearance chamber and restoring and retaining dogs on the carrying sleeve. The turning movement of each of these switch levers is preferably limited by means of a stop 65 arranged on the casing extension 62 and having preferably the form of a pin which is adapted to be engaged by one of two stops 66, 67 on the hub of the respective switch lever. Each of these switch levers is adapted to control the indicating mechanism of the automobile whereby the operator can notify the traffic on the road that he intends to turn his car in one direction so that by operating either one or the other of the switch levers 58, 59 the operator can give a signal that he intends to turn either to the left or to the right and thus facilitate traffic and avoid accidents.

In the present case these switch levers are associated with a signaling system consisting of two lamps 68, 69 arranged on the front and rear parts of the left-hand side of the vehicle and two lamps 70, 71 arranged on the front and rear parts of the right-hand side of the car, which lamps are connected with a battery 72 or other source of electric current so that upon closing the circuit through one or the other of these two sets of lamps, either one of the sets will be illuminated and thus give an indication to the traffic on the road as to the intention of the driver. In the present case the battery is connected with one side of the several lamps and the other side of the same is grounded on the metal parts of the enclosing casing 36 and the parts associated therewith.

Each of the switch levers is combined with means whereby the turning forward of this lever will cause the circuit of the lamps on one side of the car to be closed and when turning the same backwardly the circuit will be opened for extinguishing the respective lamps. The mechanism which is associated with each of the switch levers for this purpose comprises a movable contact 73 guided in a metal socket 74 which is electrically connected with one of the sets of lamps and is adapted to engage with one of the switch levers. Each of the contacts 73 is yieldingly held in its foremost position by means of a spring 75 but its movement in this direction is limited by a co-operation of stops 76, 77 arranged respectively on this contact and the guide socket 74. The metal socket 74 associated with the left-hand switch lever 58 is connected with the left-hand lamps 68, 69 and the metal socket of the movable contact associated with the right-hand switch lever 59 is connected with the right-hand lamps 70, 71. Each of the switch levers is provided with a recess 78 on that side which faces the respective contact 73, which recess is so constructed that its edge leading to that side of the lever which faces the contact 73 forms a cam, as shown in Figure 20. When each switch lever is in its rearmost or retracted position its recess 78 is in line with the movable contact 73, thereby breaking the circuit of the lamps associated therewith, as shown in Figure 20 but when this lever is moved forwardly so that the recess 78 is out of line with the contact 73 and the high part of this lever engages with the end of the contact 73 then the electric circuit controlled by the respective lever and containing one of the pairs of lamps is closed so that they are lighted and give a signaling effect.

For the purpose of holding each of the switch levers yieldingly in different positions and preventing the same from rattling a spring pressed detent pawl 79 is provided on each bracket 80 carrying one of the sockets 74, which detent pawl is yieldingly held in engagement with a recess on the respective switch lever by means of a spring 81, as shown in Figure 3.

The operation of this apparatus is as follows:

When the driver is running his car straight ahead both the left and right hand switch levers 58 and 59 are in their rearmost or retracted position indicated in Figures 5 and 7. While the parts are in this position both the switches controlling the circuits on the left and right hand sides are open and the operator is free to turn the steering post 31 for directing the course of the vehicle without influencing the direction signal.

Assuming now that the operator wishes to turn to the left and give a signal to the traffic accordingly. To do this he pushes the outer arm 63 of the left hand switch lever forwardly from the position indicated by full lines in Figure 7 so that the inner arm 64 thereof moves from the casing extension 62 across the lower locking channel and into the clearance chamber of the same and into engagement with the rear stop 42 of this chamber, as shown by full lines in Figure 9. Upon moving this lever in this direction the inner arm 64 thereof rides under the rounded or cam shape lower end 46 of the restoring dog in this chamber and lifts the latter, as shown in Figure 17.

Upon shifting this switch lever in this direction the circuit through the left hand lamps will be closed and the same will become lighted and thereby notify pedestrians and drivers of other vehicles that the respective driver intends to make a turn to the left. If the driver has not yet commenced the turning operation in the direction indicated he can unset this signal or extinguish the lamps 68 and 69 by simply turning the switch lever 58 backwardly into its rearmost position whereby its inner arm is withdrawn from the lower locking channel, the clearance chamber and the restoring dog.

If the operator after turning the lever 58 forwardly into the position shown in Figure 9 leaves the same in this position and then turns the steering post backwardly or in the direction for causing the car to turn to the left, then the front shoulder 43 of the respective clearance chamber will immediately move rearwardly across the path of the inner arm of the respective switch lever during the first part of the backward movement of the steering post in this direction and engage with the front side of the inner arm of this lever, while at the same time the left hand restoring dog is moved from underneath the respective inner arm 64 and is moved lengthwise by its spring 47 so that the abrupt front face of this dog engages with the rear side of the inner switch arm 64, as shown in Figure 11.

When the parts are in this position the operator cannot again unlock the controlling mechanism or unset the signal mechanism which indicates a turn to the left until after the driver has actually completed his turn to the left and has again straightened out his car so as to run straight ahead. By thus locking the switch lever in its set or signaling position it is impossible for the driver of the car to give a confusing signal to pedestrians or other driver nearby and it also avoids the possibility of disputes as to whether or not the driver had actually set his signal for indicating a turn to the left or whether no such setting of the signals occurred.

After the driver has effected the initial portion of the backward movement of the steering post and carrying sleeve on the left hand side of the car, the front shoulder 43 by engaging with the front side of the inner arm 64 of the respective switch lever will now cause this rear arm 64 to be pushed backwardly out of the clearance chamber and into line with the path of the lower locking channel, this position of the parts being indicated in Figure 13 from which it appears that the rear arm of this switch lever now engaged with the bottom of the lower locking channel in front of the companion clearance chamber and thereby securely locks this switch lever in its rearmost position and prevents the operator or driver of the car from unsetting or extinguishing the indicator or signal lamps at this time. The parts remain in this position until the operation of turning the steering post to the left has been completed during which time the inner arm 64 of the left hand switch lever will be prevented from moving into its unset or unlocked or released position by reason of the obstruction formed by the bottom of the lower locking channel which is engaged by the extremity of the inner arm of the lower switch lever. Should the operator attempt to throw a switch lever forward after he has already turned the steering post slightly in either the left or right direction, then the inner arm 64 of the respective lever would be blocked immediately by the vertical abrupt portion 90 of the retaining dog 50; as best shown in Figure 6. It is obvious therefore that the operator must be driving approximately straight before the switch can be thrown clear into the clearance chamber, thus causing the respective signals to light.

During the main part of the return or forward movement of the steering post and the carrying sleeve for straightening out the vehicle, the inner arm of the respective switch lever remains in the position relatively to the bottom of the lower locking channel indicated in Figure 13 so that during this movement the driver of the car cannot release, unlock or unset the left hand indicator or lamps.

After the steering shaft or post approaches its rearmost position and the inner arm 64 of the lower switch lever stands behind the front stop 43 of the carrying sleeve the vertical or longitudinal outer side 90 on the respective retaining dog 50 thereby holds the inner arm of the respective switch lever still in its rearmost or operative position until it strikes the front transverse face 91 of the companion restoring dog, as shown in Figure 14. As soon as this occurs this face of the lower restoring dog by engaging with the rear side of the inner arm 64 of the left hand switch lever will cause the latter to be turned forwardly, as shown in Figure 15, and laterally outward from the respective clearance chamber so that this arm now occupies a position within the path of the lower locking channel when this movement, which is represented as having begun in Figure 15, is completed the inner arm of the switch lever 58 will be wholly outside of this clearance chamber, as indicated in Figure 7, thereby restoring this particular switch to its rearmost or operative position and extinguishing or unsetting the particular lamps or signaling device associated therewith.

As the left hand side of the steering post and carrying sleeve moves forwardly for causing the left hand restoring dog to eject the inner arm of the left hand switch lever from the respective clearance chamber, this arm by engaging with the inclined rounded or cam shaped underside 52 of the left hand retaining dog will cause the latter to be shifted by a wedging or cam action out of the path of said inner switch arm and thus permit this switch lever to be moved without restraint into its inoperative position.

From the foregoing description it will appear that when the switch lever has been moved part way into its operative position and over the respective restoring dog and the steering post has effected but a slight part of its subsequent forward turning movement, that the inner arm of the switch lever will at this time be locked securely against rotation in either direction by engagement of the transverse front face 91 on the restoring dog with the rear side of the inner switch arm and engagement of the front shoulder 43 of the respective clearance chamber with the front side of this switch arm, as shown in Figure 11, thereby preventing this switch lever from being unset at this time and compelling the operator to complete the turning movement. In like manner this inner arm 64 of this switch lever during the last part of the rear movement or backward movement of the steering post and carrying sleeve on the left hand side thereof will hold the switch lever in its operative position until this return movement has been nearly completed inasmuch as the inner arm of the switch lever at this time is forced inwardly between the transverse front side 91 of the respective restoring dog and front shoulder 43 of this clearance chamber. After the steering post completes its return movement and the front face 91 of the respective restoring dog pushes the arm 64 out of the clearance chamber, the front shoulder 43 at the same time moves forwardly out of the path of the arm 64 and the retaining dog 50 is depressed out of the path of the arm 64 by engagement of this arm with the inclined or cam end 52 of this last mentioned dog, thereby permitting this lever to move freely into its retracted or inoperative position in which the lamps associated therewith are extinguished. The switch lever 59, upper locking groove, upper restoring and retaining dogs and clearance chamber and shoulder associated therewith all operate in substantially the same manner as those just described with reference to the left hand switch lever and associated parts and the same reference characters and description therefore apply to both the right and left hand switch controlling mechanism of this apparatus.

When a switch lever is not turned into its operative position and the adjacent part of the steering post and carrying sleeve moves forwardly by reason of the steering mechanism having been manipulated, the inner arm of the respective switch lever will remain in its retracted position in which it projects forwardly from its axis relatively to the carrying sleeve and also relatively to the respective clearance chamber when the latter is in the neutral position, thereby causing this inner arm upon moving the respective switch lever forwardly to strike the bottom of the companion locking channel in rear of the respective clearance chamber and be prevented thereby from closing the electric circuit with which the respective switch lever is associated. It will therefore be apparent that when the switch lever is in its operative position its inner arm projects rearwardly from the axis of this lever and into the companion locking channel, but when the switch lever is in its inoperative position the inner arm thereof projects from its pivot circumferentially in the opposite direction around the carrying sleeve so that the switch cannot be closed or opened until the steering post and the steering mechanism have been practically returned to their central or straight position.

By means of this improved signal controlling mechanism the lost motion between the switch levers which are mounted on the stationary circuit and the actuated means which are mounted on the steering post is reduced to a minimum and virtually prevents the switch from being unlocked after it is once set and after the initial part of the steering operation has commenced, and it is also practically impossible to again unlock the signaling mechanism and restore the same to its inoperative position until the steering post and mechanism has been again restored to its straightened or neutral position.

By thus eliminating the lost motion between these parts in the manner described, it is possible to make shorter turns with the vehicle equipped with this device and to give prompt notice of the intention to so turn the vehicle and also prevents unsetting after such short turns have been made as well as preventing restoration of the signal to its neutral position until after the car has been practically straightened out into its neutral position. This device therefore reduces the possibility of disputes in case of accident as to who was to blame and enables the driver of the car to determine with absolute certainty the condition of the signaling mechanism at any given time.

I claim as my invention:

1. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, and a restoring dog yieldingly mounted within said chamber and adapted to clear said lever and permit said carrier to turn in one direction relatively to said lever but to engage said lever and eject the same from said clearance chamber upon moving the carrier in the opposite direction.

2. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, and a restoring dog yieldingly mounted within said chamber and adapted to clear said lever and permit said carrier to turn in one direction relatively to said lever but to engage said lever and eject the same from said clearance chamber upon moving the carrier in the opposite direction, said dog being mounted so as to be slidable in a direction parallel with the axis of said carrier and having an abrupt transverse face on its front side and an inclined face extending from its rear side along one of its longitudinal sides.

3. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, and a restoring dog yieldingly mounted within said chamber and adapted to clear said lever and permit said carrier to turn in one direction relatively to said lever but to engage said lever and eject the same from said clearance chamber upon moving the carrier in the opposite direction, said chamber having a rear shifting shoulder adjacent to said restoring dog which is adapted to be engaged by the inner arm of said switch lever.

4. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber and adapted to clear said lever and permit said carrier to turn in one direction relatively to said lever but to engage said lever and eject the same from said clearance chamber upon moving the carrier in the opposite direction, said carrier having a guideway arranged parallel with the axis thereof in which said dog slides, and a spring for holding said dog yieldingly in its operative position.

5. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber and adapted to clear said lever and permit said carrier to turn in one direction relatively to said lever but to engage said lever and eject the same from said clearance chamber upon moving the carrier in the opposite direction, said carrier having a guideway arranged parallel with the axis thereof in which said dog slides, a spring for holding said dog yieldingly in its operative position, and co-operating stops arranged on said carrier and dog for limiting the movement of the latter under the action of said spring.

6. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber and adapted to clear said lever and permit said carrier to turn in one direction relatively to said lever but to engage said lever and eject the same from said clearance chamber upon moving the carrier in the opposite direction, and a retaining dog arranged in said clearance chamber and adapted to prevent the inner arm of said lever from entering said clearance chamber until the front side of the restoring dog engages this arm during the forward movement of the carrier and then permits this arm to swing through the clearance chamber from a rearwardly inclined position to a forwardly inclined position relatively thereto.

7. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber and adapted to clear said lever and permit said carrier to turn in one direction relatively to said lever but to engage said lever and eject the same from said clearance chamber upon moving the carrier in the opposite direction, and a retaining dog arranged in said clearance chamber and adapted to prevent the inner arm of said lever from entering said clearance chamber until the front side of the restoring dog engages this arm during the forward movement of the carrier and then permits this arm to swing through the clearance chamber from a rearwardly inclined position to a forwardly inclined position relatively thereto, said chamber having a front shifting shoulder adjacent to said retaining dog which is adapted to be engaged by the inner arm of said switch lever.

8. A direction signaling mechanism for automobiles having a rotary member and a stationary support adjacent to said member, comprising a carrier adapted to be mounted on said rotary member and provided with a circumferential locking channel and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber at the rear end thereof and adapted to clear said lever and permit said carrier to turn in one direction relatively to said lever but to engage said lever and eject the same from said clearance chamber upon moving the carrier in the opposite direction, and a retaining dog yieldingly mounted within said chamber at the front end thereof and adapted to prevent said lever from entering said clearance chamber until the front side of said restoring dog engages this lever during the forward movement of the carrier, said chamber having a rear shifting shoulder arranged adjacent to said restoring dog and adapted to be engaged by said lever when the latter is turned in one direction, and said chamber having a front shifting shoulder arranged adjacent to said retaining dog and adapted to be engaged by said lever when the latter is turned in another direction.

9. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber and adapted to clear said lever and permit said carrier to turn in one direction relatively to said lever but to engage said lever and eject the same from said clearance chamber upon moving the carrier in the opposite direction, a retaining dog arranged in said clearance chamber and adapted to prevent the inner arm of said lever from entering said clearance chamber until the front side of the restoring dog engages this arm during the forward movement of the carrier and then permits this arm to swing through the clearance chamber from a rearwardly inclined position to a forwardly inclined position relatively thereto, said carrier having a guideway arranged parallel with the axis thereof in which said retaining dog slides, and a spring for holding said dog yieldingly in its operative position.

10. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber and adapted to clear said lever and permit said carrier to turn in one direction relatively to said lever but to engage said lever and eject the same from said clearance chamber upon moving the carrier in the opposite direction, a retaining dog arranged in said clearance chamber and adapted to prevent the inner arm of said lever from entering said clearance chamber until the front side of the restoring dog engages this arm during the forward movement of the carrier and then permits this arm to swing through the clearance chamber from a rearwardly inclined position to a forwardly inclined position relatively thereto, said carrier having a guideway arranged parallel with the axis thereof in which said retaining dog slides, a spring for holding said dog yieldingly in its operative position, and co-operating stops arranged on said carrier and retaining dog for limiting the movement of the latter under the action of said spring.

11. A direction signaling mechanism for automobiles having a rotary member and a stationary support adjacent to said member, comprising a carrier adapted to be mounted on said rotary member and provided with a circumferential locking channel, and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, a restoring dog yieldingly mounted within said chamber and adapted to clear said lever and permit said carrier to turn in one direction relatively to said lever but to engage said lever and eject the same from said clearance chamber upon moving the carrier in the opposite direction, a retaining dog arranged in said clearance chamber and adapted to prevent the inner arm of said lever from entering said clearance chamber until the front side of the restoring dog engages this arm during the forward movement of the carrier and then permits this arm to swing through the clearance chamber from a rearwardly inclined position to a forwardly inclined position relatively thereto, said carrier having a guideway arranged parallel with the axis thereof in which said retaining dog slides, and a spring for holding said dog yieldingly in its operative position, said retaining dog having an outer longitudinal face which is concentric with the axis of the carrier and an inclined face extending from the rear end of this dog along one of its lateral longitudinal sides.

12. A direction signaling mechanism for automobiles having a rotary member and a stationary support adjacent to said member, comprising a carrier adapted to be mounted on said rotary member and provided with a circumferential locking channel and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, said lever forming part of an electric circuit and having a cam surface, and an electric contact mounted on said support and adapted to be shifted by said cam surface and to close an electric circuit by engagement with said lever.

13. A direction signaling mechanism for automobiles having a rotary member and a stationary support adjacent to said member, comprising a carrier adapted to be mounted on said rotary member and provided with a circumferential locking channel and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, said lever forming part of an electric circuit and having a cam surface, an electric contact mounted on said support and adapted to be shifted by said cam surface and to close an electric circuit by engagement with said lever, a guideway on said support for said contact, a spring for moving said contact toward said lever, and cooperating stops on said support and contact for limiting the movement of said contact under the action of said spring.

14. A direction signaling mechanism for automobiles having a rotary member and a stationary support adjacent to said member, comprising a carrier adapted to be mounted on said rotary member and provided with a circumferential locking channel and an enlarged clearance chamber in a part of said channel, a switch lever adapted to control a signal circuit and pivoted on said support and having an outer arm adapted to be operated manually and an inner arm adapted to swing through said clearance chamber and to be held against turning in one direction or another direction by engagement of its inner arm with the bottom of said channel on one side or the other of said clearance chamber, said lever forming part of an electric circuit and having a cam surface, an electric contact mounted on said support and adapted to be shifted by said cam surface and to close an electric circuit by engagement with said lever, and a spring pressed detent for yieldingly holding said lever in position.

In testimony whereof I affix my signature.

WILLIAM A. ECKERT.